(No Model.)

H. C. SPALDING.
SPLICE FOR ELECTRICAL CONDUCTORS.

No. 327,479. Patented Sept. 29, 1885.

Attest:
Raymond T. Barnes
W. Frisby

Inventor:
Henry C. Spalding
By Parker W. Page
atty.

UNITED STATES PATENT OFFICE.

HENRY C. SPALDING, OF BOSTON, MASSACHUSETTS.

SPLICE FOR ELECTRICAL CONDUCTORS.

SPECIFICATION forming part of Letters Patent No. 327,479, dated September 29, 1885.

Application filed April 18, 1884. (No model.)

*To all whom it may concern:*

Be it known that I, HENRY C. SPALDING, a citizen of the United States, and a resident of Boston, in the county of Suffolk and State of Massachusetts, have invented a new and Improved Splice for Electrical Conductors, of which the following is a specification, reference being had to the drawings accompanying and forming a part of the same.

My invention consists in a means of splicing or joining separate lengths of electrical conductors, the invention being generally useful for this purpose, but more particularly applicable to the conducting-wires of cables which are inclosed in one or more insulating sheaths or layers.

The conducting-wires of cables have heretofore been joined by solder, and the joints wound with wire, the ends of the coil thus formed having been united by solder to each length of wire, in order that in the event of the conductors separating at the joint the coil may be lengthened and still preserve electrical continuity between them. This plan is open to the objections that if the coil be formed by a wire of the same diameter as the line-wires the diameter of the conductor is increased threefold, and a bulky joint formed that is difficult to insulate properly, and that may not be passed through certain machines used in the manufacture of insulated cables. If, on the other hand, the wire be of very small diameter, its function as a bridge in case the main-wire parts is destroyed, as in such event it would either not carry the current at all or else injuriously increase the resistance of the line.

The first object of my invention is to improve this form of joint, and this I accomplish by passing over the joined ends of the main wire or conductor a slotted tube of a good conducting metal, more specifically described hereinafter.

Another objection to the present method of joining or splicing the wires of cables is in the fact that the solder used becomes brittle when cold, so that a rigid splice is made, which, when subjected to strain, is liable to break. I have obviated this by using a solder, which I find can be made of an alloy of silver and copper, and which secures a perfect joint which may be bent or twisted with little liability of breaking.

I have illustrated the splice formed in accordance with my invention in the accompanying drawings.

Figure 1:
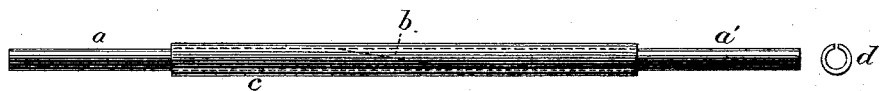
Figure 2:

Figure 1 is a side view of the splice with an end view of the slotted tube. Fig. 2 is a modification of the same.

The letters $a$ $a'$ designate the wires or conductors of any kind that are to be united. Their ends are beveled off by a swage, or by any other convenient means, and soldered together, as shown at $b$.

Previously to uniting the wires, a tube, $c$, which is slotted, as shown at $d$, is slipped over the end of one of them, and after they are united it is slipped along so as to cover the joint. It is left in this condition without other means than friction to hold it in place. This tube I make of silver, so that but very little metal is needed, whereby the diameter of the conductor is but slightly increased. When formed in the manner indicated in Fig. 1, it should have a bore or internal diameter slightly less than that of the conductor, in order that it may bind tightly on the same. In lieu of being previously formed and slipped over the joint, it may be rolled or welded around the joint, if so desired. Generally, I prefer to apply or form around the joined conductors a tube spirally slotted, as shown in Fig. 2, the letter $e$ designating the spiral slot. This form of tube is preferable in some respects, as it permits the connection to stretch somewhat in case the soldered joint gives way.

In uniting the wires together, or the tubes to the wires, I use a solder which contains no zinc, and which is not brittle. Such a solder I have found can be made from copper one part, silver two parts, or thereabouts. This alloy melts at a low temperature, and forms a very valuable solder for this purpose. A joint thus formed is flexible, and adds but little to the diameter of the conductor, which may therefore be passed through an insulating-machine, such as I have described in other applications.

I am aware of the use, in soldering or splicing wires and other conductors, of the ordinary silver solder, and I do not claim this.

What I claim as my invention is—

1. The combination, with conductors, the ends of which are joined by solder, of a slotted metal tube surrounding the joint and held in position on the conductors by friction, as and for the purpose set forth.

2. The combination, with conductors, the ends of which are joined by solder, of a slotted tube of silver surrounding the joint and held in position by friction, as and for the purpose set forth.

3. The combination, with conductors, the ends of which are joined by solder, of a spirally-slotted tube surrounding the joint and held in position thereon by friction, as set forth.

4. The combination, with conductors, the ends of which are joined by a solder composed of copper and silver, of a slotted tube surrounding the joint and held in position thereon by friction, as described.

In testimony whereof I have hereunto set my hand this 16th day of April, 1884.

HENRY C. SPALDING.

Witnesses:
S. H. DUDLEY,
W. P. DUDLEY.